(12) United States Patent
Feiguine et al.

(10) Patent No.: US 10,673,963 B1
(45) Date of Patent: *Jun. 2, 2020

(54) DISCOVERY OF REMOTE STORAGE SERVICES AND ASSOCIATED APPLICATIONS

(71) Applicant: ServiceNow, Inc., Santa Clara, CA (US)

(72) Inventors: Alexandra Feiguine, Sha'ar Efrayim (IL); Aviya Aron, Shafir (IL); Robert Bitterfeld, Petah Tikva (IL); Bary Solomon, Petah Tikva (IL); Noam Biran, Kfar Menachem (IL); Hail Tal, Kohav Yair (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,701

(22) Filed: Jan. 18, 2019

(51) Int. Cl.
| | | |
|---|---|---|
| *H04L 29/08* | (2006.01) | |
| *G06F 16/23* | (2019.01) | |
| *G06F 9/50* | (2006.01) | |
| *G06F 9/48* | (2006.01) | |

(52) U.S. Cl.
CPC ............ *H04L 67/16* (2013.01); *G06F 9/4843* (2013.01); *G06F 9/5016* (2013.01); *G06F 16/2358* (2019.01); *H04L 67/1097* (2013.01)

(58) Field of Classification Search
CPC . H04L 67/16; H04L 67/1097; G06F 16/2358; G06F 9/4843; G06F 9/5016
USPC ......................................................... 709/223
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,816,898 B1 | 11/2004 | Scarpelli |
| 6,895,586 B1 | 5/2005 | Brasher |

(Continued)

OTHER PUBLICATIONS

Alexandra Feiguine, Aviya Aron, Robert Bitterfeld, Bary Solomon, Noam Biran, Hail Tal, Amazon DynamoDB Discovery, ServiceNow Product Documentation, Published Oct. 3, 2018, Retrieved Dec. 12, 2018.

(Continued)

*Primary Examiner* — Tauqir Hussain
(74) *Attorney, Agent, or Firm* — Fletcher Yoder PC

(57) ABSTRACT

A discovery application may obtain, from a remote storage system configured to host storage structures, first data that identifies relationships among the storage structures. The discovery application may generate, based on the first data, a mapping of the storage structures, store the mapping as one or more configuration items, and provide, to the remote storage system, instructions configured to cause the remote storage system to notify the discovery application of modification events associated with the storage structures. The discovery application may receive, from the remote storage system, a notification of a modification event associated with a particular storage structure of the storage structures and, in response, obtain, from the remote storage system, second data that identifies a modification to the particular storage structure. The discovery application may modify the mapping based on the second data and store the modified mapping by updating the one or more configuration items.

20 Claims, 9 Drawing Sheets

(56) References Cited

U.S. PATENT DOCUMENTS

| | | |
|---|---|---|
| 7,027,411 B1 | 4/2006 | Pulsipher |
| 7,392,300 B2 | 6/2008 | Anantharangachar |
| 7,617,073 B2 | 11/2009 | Trinon |
| 7,877,783 B1 | 1/2011 | Cline |
| 7,945,860 B2 | 5/2011 | Vambenepe |
| 8,554,750 B2 | 10/2013 | Rangaranjan |
| 8,874,704 B2 | 10/2014 | Nath |
| 9,830,230 B1* | 11/2017 | Rai .................. G06F 16/13 |
| 9,935,838 B2 | 4/2018 | Lin |
| 10,044,566 B1 | 8/2018 | Grisco |
| 10,091,067 B2 | 10/2018 | Langston |
| 10,148,493 B1 | 12/2018 | Ennis |
| 2005/0050537 A1* | 3/2005 | Thompson ............. G06F 8/24 717/165 |
| 2012/0198073 A1 | 8/2012 | Srikanth |
| 2015/0212990 A1* | 7/2015 | Tseng .............. G06F 3/04847 715/234 |
| 2015/0341230 A1 | 11/2015 | Dave |
| 2016/0182299 A1 | 6/2016 | Polinati |
| 2017/0103223 A1* | 4/2017 | Deulgaonkar .......... G06F 9/544 |
| 2018/0146049 A1* | 5/2018 | Africa ................. H04L 67/16 |
| 2018/0322556 A1 | 11/2018 | Padmanabh |
| 2018/0373774 A1 | 12/2018 | Rangarajan |

OTHER PUBLICATIONS

Alexandra Feiguine, Aviya Aron, Robert Bitterfeld, Bary Solomon, Noam Biran, Hail Tal, AWS S3 discovery, ServiceNow Product Documentation, Published Jul. 24, 2018, Retrieved Dec. 12, 2018.

BMC Helix Platform Datasheet, Obtained Mar. 21, 2019, 2 pages, http://documents.bmc.com/products/documents/69/36/486936/486936.pdf.

BMC Control-M Automation API Datasheet, Obtained Mar. 21, 2019, 2 pages, http://documents.bmc.com/products/documents/89/36/488936/488936.pdf.

* cited by examiner

DISCOVERY OF REMOTE STORAGE SERVICES AND ASSOCIATED APPLICATIONS

BACKGROUND

Computing devices, software applications, software services, databases, and other computing resources that make up a computer network may be discovered and the relationships therebetween may be mapped. These elements of the network, as well as the relationships, may be stored as configuration items in a database. The stored configuration items may later be retrieved and used to generate a visualization of a state or arrangement of these elements within the managed network. Discovering a computing device, database, software application, software service, or other computing resource involves developing software processes that are capable of interacting with the devices, databases, applications, or services in order to gather information needed for detection, classification, and/or identification thereof.

SUMMARY

A remote computing system may provide a storage system and computational resources on behalf of a managed network. The storage system may include a database system that provides various databases and a file storage system that provides containers for storage of files. The databases and containers may be collectively referred to as storage structures. The computing resources may provide for execution of various services or software functions that may access, interact with, and execute in response to changes in the storage structures. In some implementations, these services or software functions may be assigned computing resources on an as-needed basis (e.g., in response to a client device transmitting a request for execution thereof).

Since these storage structures and services are provided by the remote computing system it may be difficult to maintain an accurate and up-to-date mapping thereof. A discovery application may need to be configured to communicate with the remote computing system to obtain, using the communication interfaces provided thereby, information to generate the mapping of the storage structures and services. Additionally, as the storage structures, services, and/or relationships therebetween are modified, a mapping generated at an earlier time may be stale or out-of-date. Thus, the discovery application may continually or periodically update the mapping to keep it consistent with the actual state of the remote computing system.

One way to keep the mapping up-to-date may involve the discovery application periodically polling the remote computing system to identify any modification made to the storage structures and/or services. However, this approach may consume computing resources and network bandwidth, making it undesirable in some circumstances. For example, when relying on polling, discovery application may consume computing resources and network bandwidth even when no modifications have been made to the storage structures and the mapping thus does not need updating. Accordingly, rather than polling the remote computing system for updates, the discovery application may be configured to request notification of modification events from the remote computing system. This may allow the discovery application to update the mapping when a specific storage structure or service is modified without wasting computing resources and network bandwidth when no modifications have been made.

To that end, the discovery application may first obtain, from a remote storage system of the remote computing system, first data that identifies the storage structures provided thereby. The first data may identify, for example, attributes of the storage structures, relationship between the storage structures and services, and relationships that each of the storage structure has with other storage structures. The discovery application may then generate and store a mapping of these storage structures. This initial mapping may define the storage structures and services that are to be monitored for modifications.

The discovery application may request that the remote storage system generate and transmit, to the discovery application, notifications of modification events that take place on remote storage system. A modification event may include additions, deletions, or changes of a particular storage structure or the contents thereof. The request sent by the discovery application may specify, for example, specific storage structures (e.g., all storage structures identified by the first data) to be monitored for modification events and a subset of possible modification events to be monitored for. In response to this request, the remote storage system may dedicate one or more services to monitoring the specified storage structures for the specified modification events.

In one example, the one or more services may monitor one or more log files that contain a history of operations carried out on the storage structures. A subset of these operations may represent modification events. The one or more services may generate a notification when the one or more log files indicate one or more of the specified modification events. The remote storage system may transmit the notification the discovery application by the remote storage service when a particular storage structure is modified. The notification may be provided to a uniform resource locator (URL) that addresses the discovery application, and may identify the specific storage structures that have undergone a modification event.

Based on receiving the notification, the discovery application may be configured to obtain, from the remote storage system, second data that indicates the modifications made to the particular storage structure. Notably, in obtaining the second data, the discovery application may request, from the remote storage system, information that described the modification to the particular storage structure, but might not request information regarding storage structures that remain unchanged. Accordingly, the discovery application might not dedicate computing resources and network bandwidth to obtaining information that is already known and has not been modified by the modification event.

Based on the second data, the discovery application may generate an updated mapping of the remote storage systems and the storage structures provided thereby. Specifically, the discovery application may update aspects of the original mapping for which the second data indicated one or more changes. In some cases, the discovery application may be configured to batch the operations related to updating the mapping. For example, when notifications are received at above a particular threshold frequency, rather than updating the mapping for independently for each notification, the discovery application may be configured to aggregate a plurality of notifications and periodically obtain second data that indicates each of the modifications associated with the plurality of notifications.

Accordingly, a first example embodiment involves a computing system that includes a configuration management database (CMDB) disposed within a computational instance of a remote network management platform. The computational instance is associated with a managed network. A remote storage system is configured to host storage structures on behalf of the managed network. The computing system also involves a discovery application configured to perform operations. The operations include determining an entry point for the remote storage system, and obtaining, from the remote storage system and by way of the entry point, first data that identifies relationships among the storage structures. The operations also include generating, based on the first data, a mapping of the storage structures, and storing, in the CMDB, the mapping as one or more configuration items. The operations additionally include providing, to the remote storage system, instructions configured to cause the remote storage system to notify the discovery application of modification events associated with the storage structures. The operations further include receiving, from the remote storage system, a notification of a modification event associated with a particular storage structure of the storage structures and, in response to receiving the notification, obtaining, from the remote storage system and by way of the entry point, second data that identifies a modification to the particular storage structure. The operations yet further include modifying the mapping based on the second data to indicate the modification to the particular storage structure, and storing the modified mapping in the CMDB by updating the one or more configuration items.

In a second example embodiment a method includes determining an entry point for a remote storage system configured to host storage structures on behalf of a managed network and obtaining, from the remote storage system and by way of the entry point, first data that identifies relationships among the storage structures. The method also includes generating, based on the first data, a mapping of the storage structures and storing, in a CMDB disposed within a computational instance of a remote network management platform, the mapping as one or more configuration items. The computational instance is associated with the managed network. The method additionally includes providing, to the remote storage system, instructions configured to cause the remote storage system to provide notifications of modification events associated with the storage structures. The method further includes receiving, from the remote storage system, a notification of a modification event associated with a particular storage structure of the storage structures and, in response to receiving the notification, obtaining, from the remote storage system and by way of the entry point, second data that identifies a modification to the particular storage structure. The method yet further includes modifying the mapping based on the second data to indicate the modification to the particular storage structure, and storing the modified mapping in the CMDB by updating the one or more configuration items.

In a third example embodiment, an article of manufacture may include a non-transitory computer-readable medium, having stored thereon program instructions that, upon execution by a computing system, cause the computing system to perform operations in accordance with the second example embodiment.

In a fourth example embodiment, a computing system may include at least one processor, as well as memory and program instructions. The program instructions may be stored in the memory, and upon execution by the at least one processor, cause the computing system to perform operations in accordance with the second example embodiment.

In a fifth example embodiment, a system may include various means for carrying out each of the operations of the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
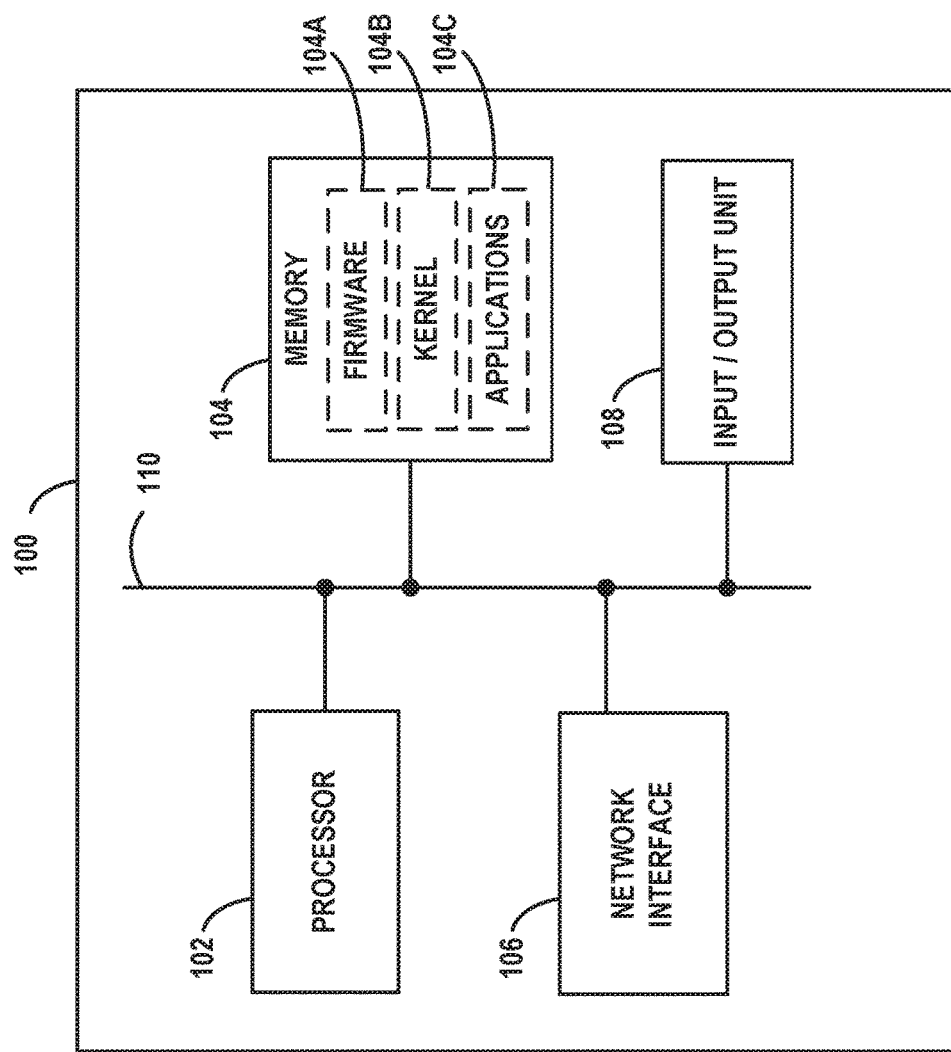
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
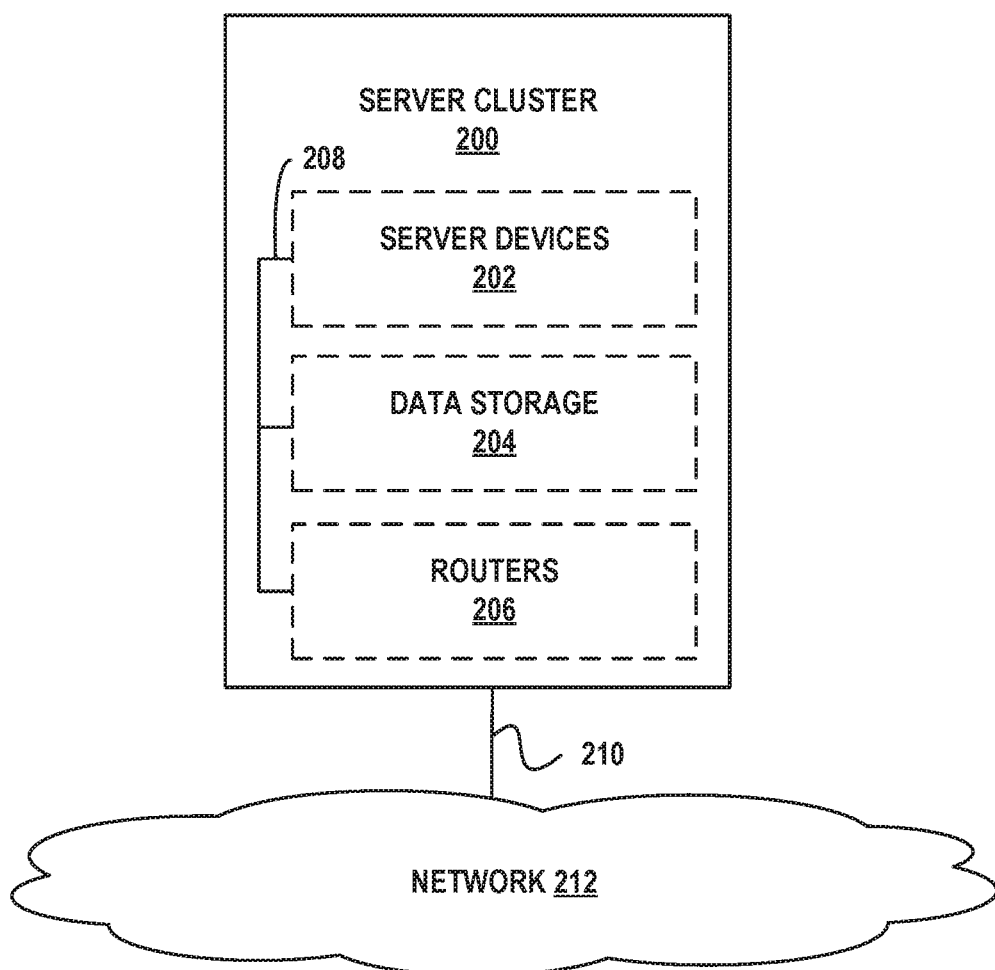
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
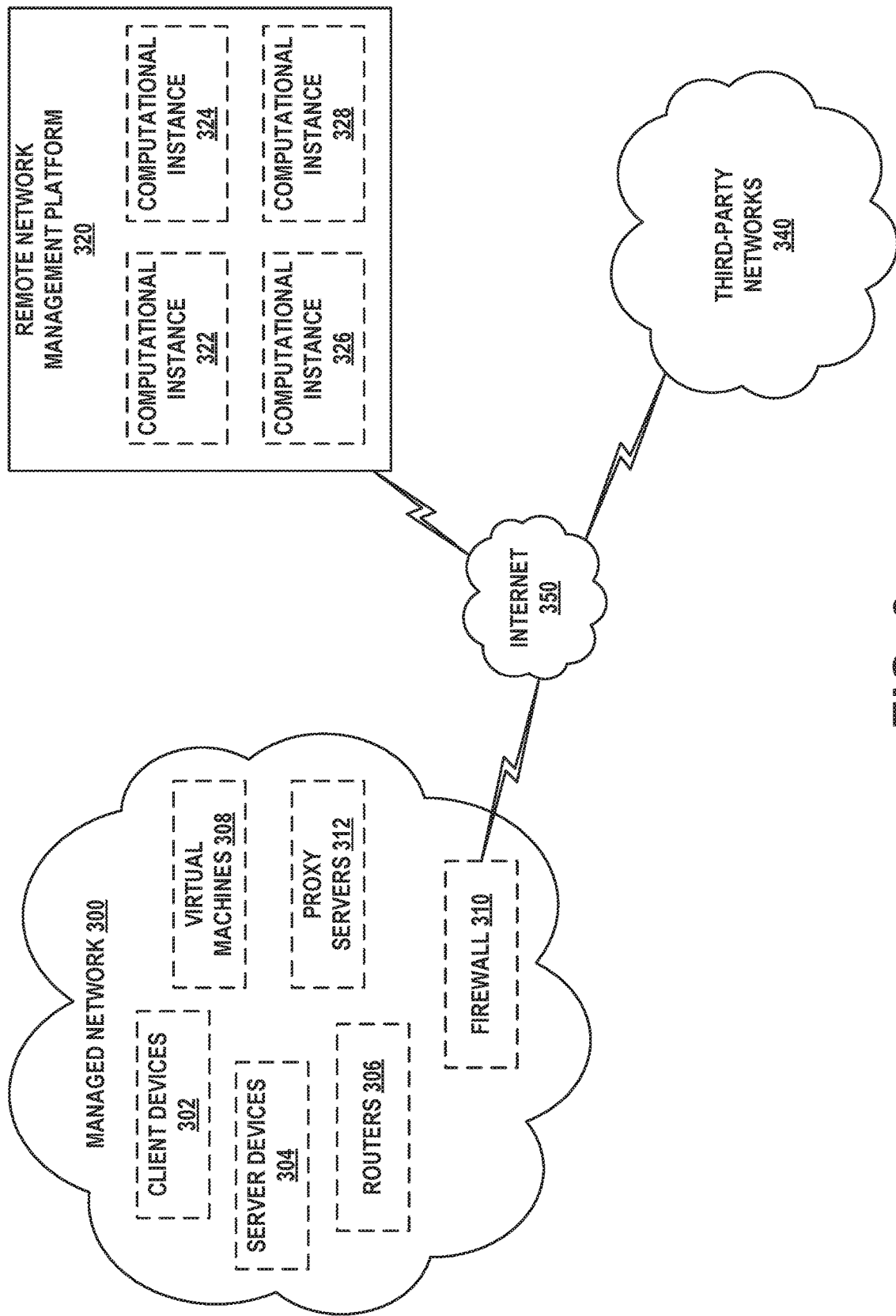
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
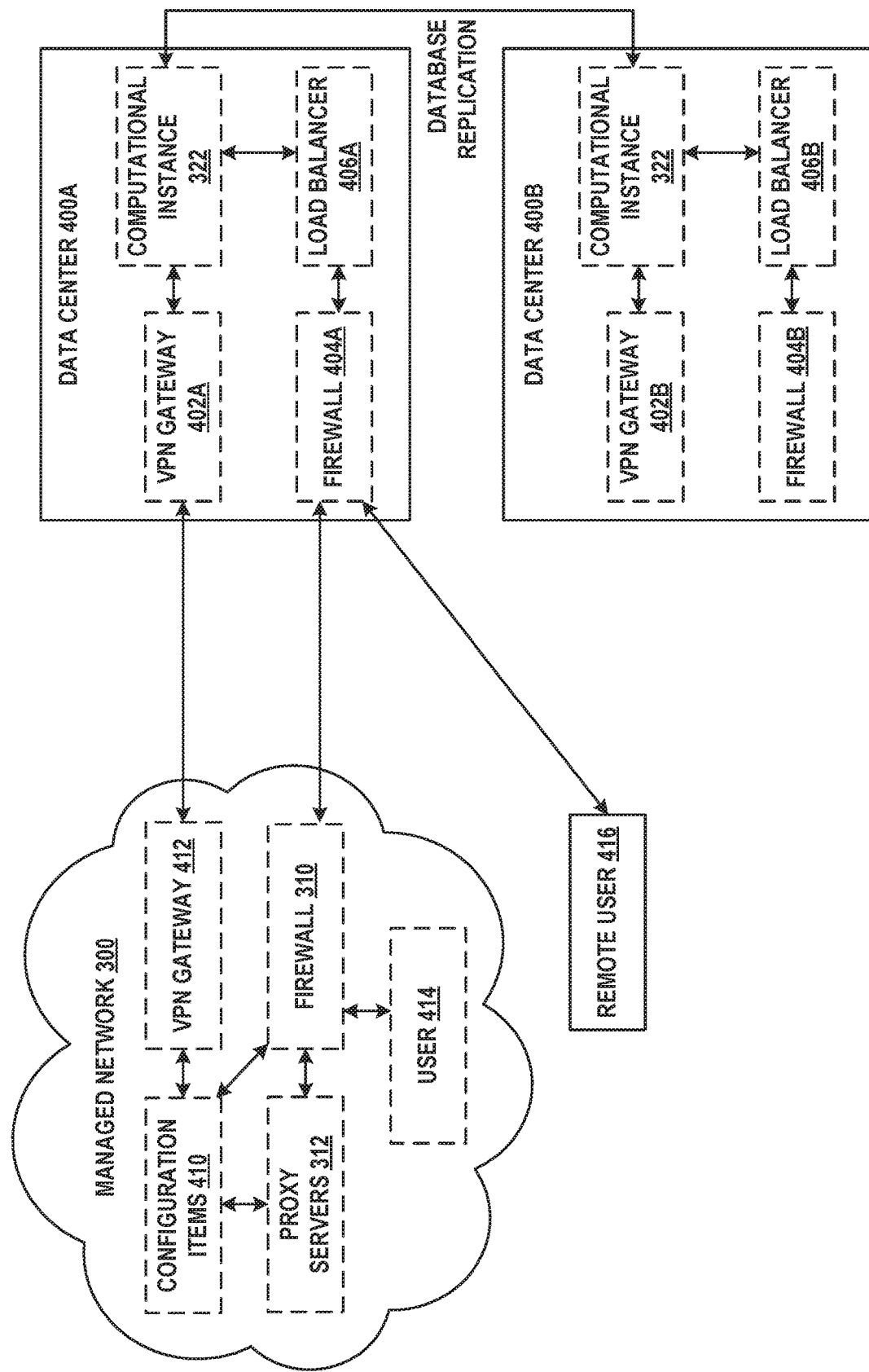
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
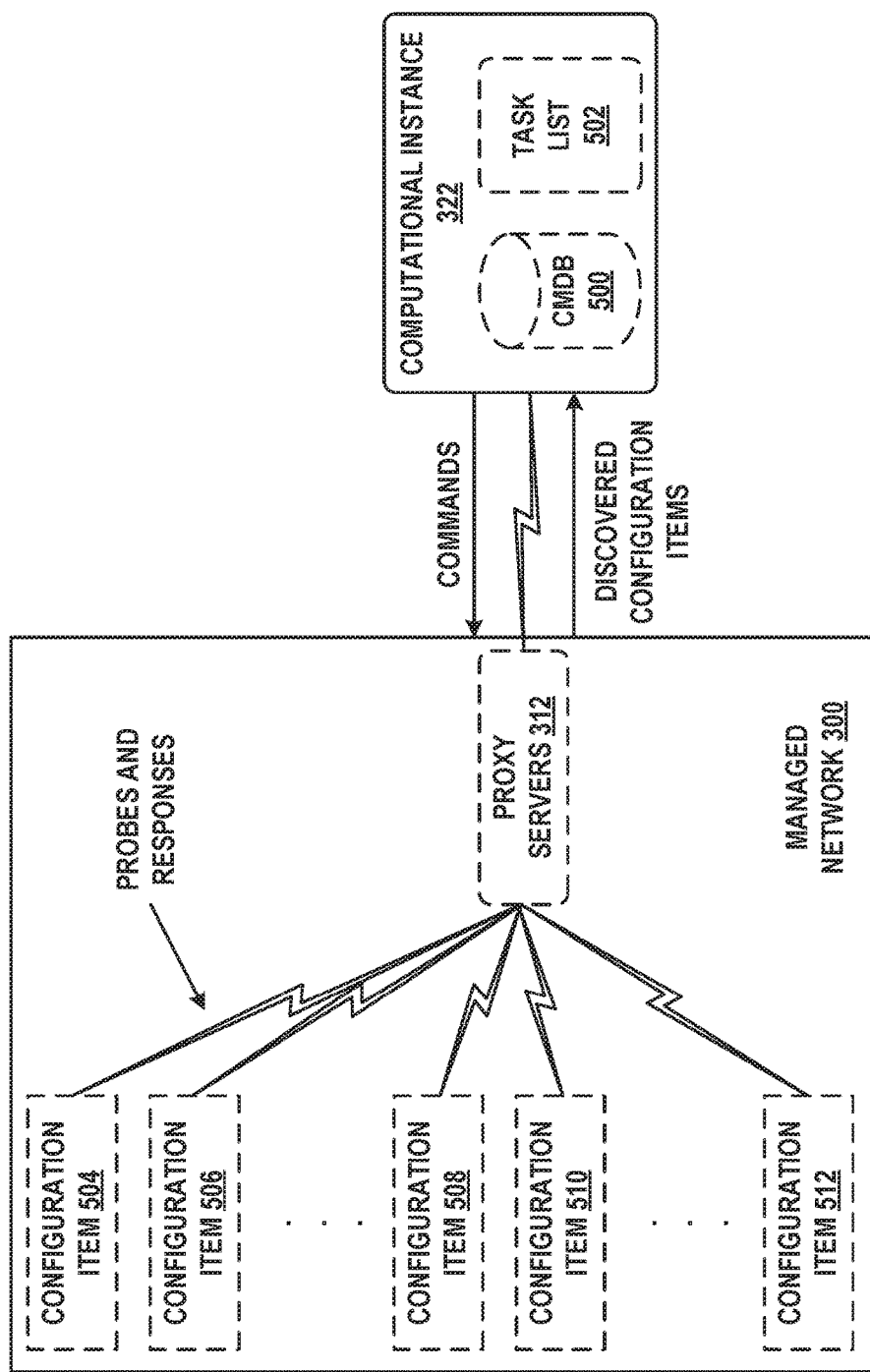
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500.

For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
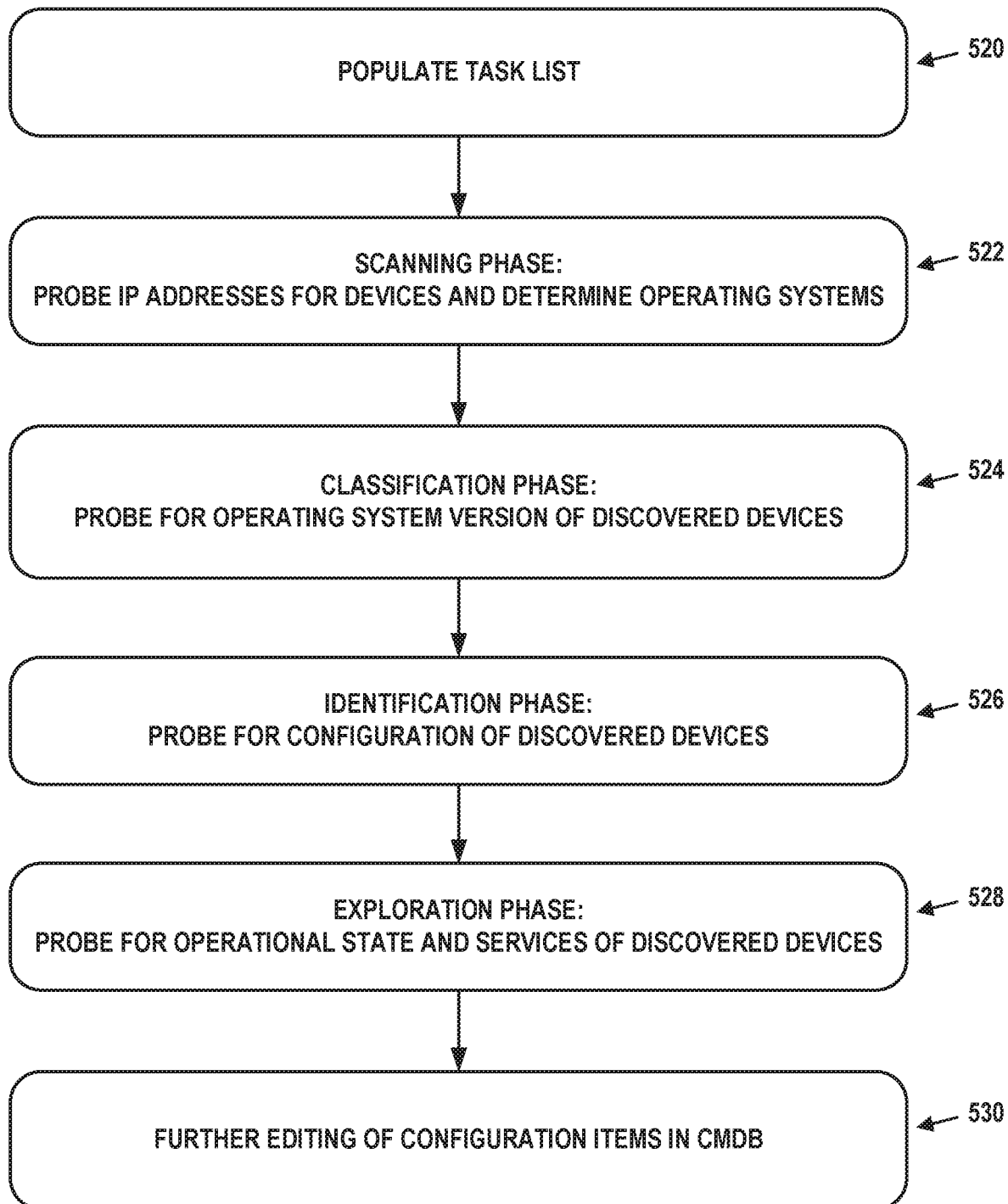
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE REMOTE COMPUTING SYSTEM

Figure 6:
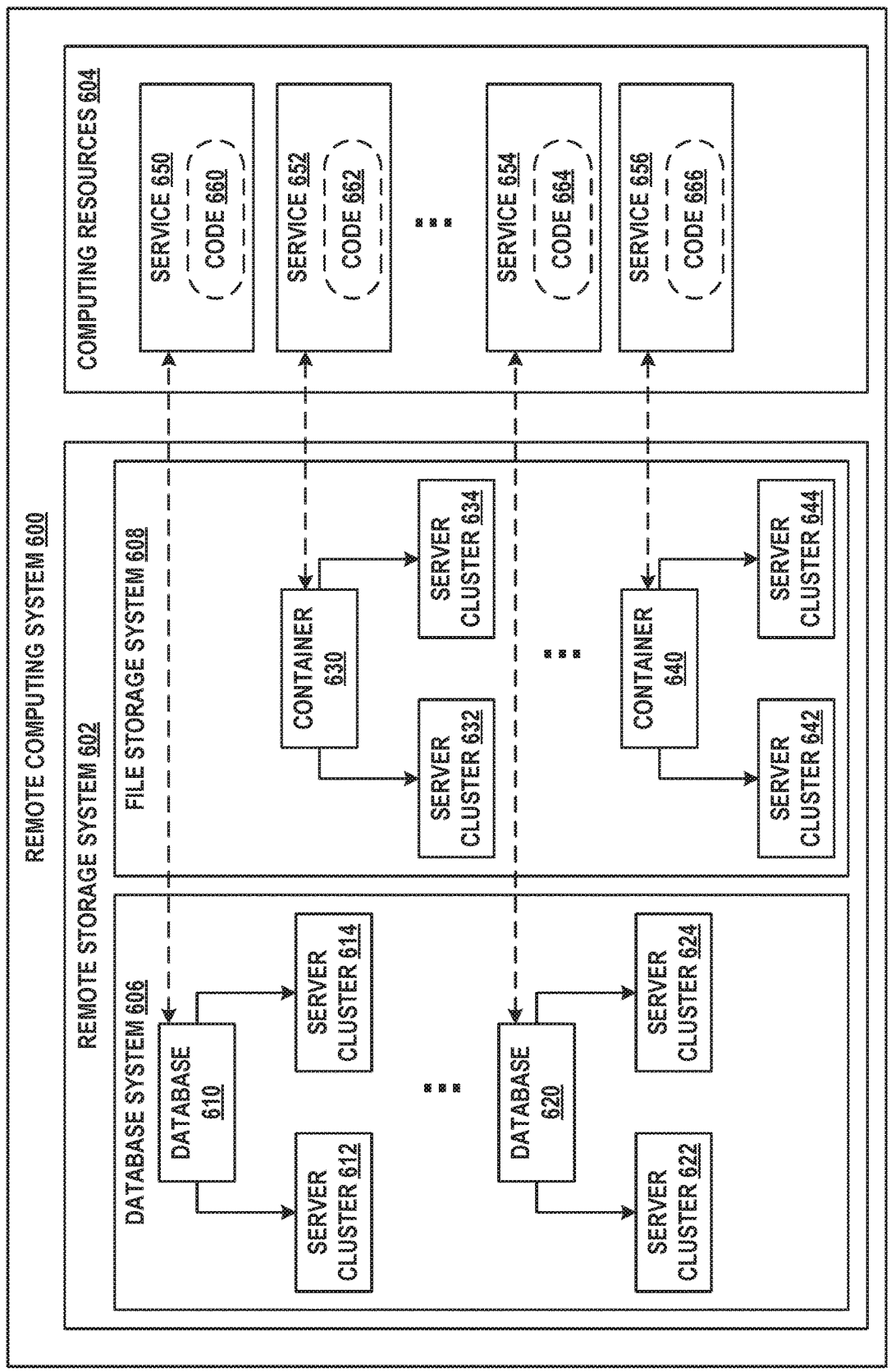
FIG. 6 illustrates a remote computing system, in accordance with example embodiments.

FIG. 6 illustrates an example remote computing system 600. Remote computing system 600 may include remote storage system 602 and computing resources 604. Remote computing system 600 may represent one example of third-party network 340. For example, remote computing system 600 may be a computing system of AMAZON WEB SERVICES®, which provides on-demand cloud computing and storage platforms. Remote storage system 602 may include database system 606 and file storage system 608, each providing respective storage structures. In one example, remote computing system 600 may provide the resources therein to various computing devices on behalf of managed network 300. That is, remote computing system 600 may dedicate portions of remote storage system 602 (e.g., one or more storage structures) and computing resources 604 (e.g., one or more services) to managed network 300 and/or computing devices associated therewith.

In order to quantify the extent of usage of resources of remote computing system 600 by managed network 300, a discovery application may be configured to discover and map the resources that are utilized by managed network 300. However, since remote computing system 600 may be a cloud-based computing and storage platform, the discovery application might not be able to directly explore the computing devices (e.g., parse files thereon and monitor the software processes executing thereon) that make up remote computing system 600 as part of the discovery and mapping process. Instead, the discovery application may need to utilize the application programming interfaces and/or command line interfaces provided by remote computing system 600 to collect the information needed to discover and map the resources therein.

Additionally, as the resources provided by remote computing system 600 change over time (e.g., new storage structures are added or old storage structures are deleted), the discovery application may need to repeat the discovery and mapping operations to maintain an up-to-date version of these resources. However, repeating the discovery and mapping operations may utilize a large amount of computing power and time, especially when the amount of resources used by managed network 300 is large. Accordingly, the discovery application may instead cause remote computing system 600, or aspects thereof, to generate notifications that indicate specific changes made to the resources. The discovery application may then gather additional information concerning those resources that have been changed or modified since a last mapping of remote computing system 600. The discovery application might not, however, re-discover or re-map aspects of remote computing system 600 that have not been modified.

Returning to FIG. 6, database system 606 may include a plurality of databases, including database 610 and database 620, which are examples of the storage structures provided on behalf of managed network 300. In an example implementation, databases 610 and 620 may be relational databases configured to store data in tables arranged into rows and columns, with a unique key identifying each row. Databases 610 and 620 may thus use a structured query language (SQL) for querying and maintenance thereof. In another example implementation, databases 610 and 620 may represent "not only SQL" (NoSQL) databases configured to store data in a plurality of additional formats or arrangements. For example, databases 610 and 620 may store data as tables organized by columns (rather than rows), as key-value pairs (e.g., where each value stored in the database is assigned a corresponding key), as documents (e.g., JavaScript Object Notation (JSON) or XML files), or as graph structures (e.g., where data is stored as nodes that are interconnected by edges). Database system 606 may thus represent, for example, DYNAMODB® provided by AMAZON WEB SERVICES®.

Each of databases 610 and 620 may be replicated among one or more server clusters. For example, a first copy of database 610 may be stored on server cluster 612 and a second copy of database 610 may be stored on server cluster 614. Similarly, a first copy of database 620 may be stored on server cluster 622 and a second copy of database 620 may be stored on server cluster 624. The first and second copies may be periodically or continually synchronized to keep the data stored therein consistent. Such replication may provide data redundancy in the event of one of the server clusters becoming temporarily unavailable and/or permanently losing its respective copy of the database.

Server clusters 612, 614, 622, and 624 may be geographically-distributed, allowing for client devices to access the server cluster that is geographically closest to the client device (or at least closer than one or more other server clusters), thus reducing the transmission time of communications between the client device and the database. In one example, server clusters 612 and 622 may be located in a first data center at a first geographic location and server clusters 614 and 624 may be located in a second data center at a second geographic location different from the first geographic location. Other geographic distributions are possible.

Remote storage system 602 may also include file storage system 608. File storage system 608 may include a plurality of file storage containers, including container 630 and container 640, which are additional examples of the storage structures provided on behalf of managed network 300. Containers 630 and 640 may represent storage space assigned to managed network 300 and may be configured to store therein a plurality of different file types. Each file stored in a container may be addressable using a corresponding unique identifier. For example, the unique identifier may be a random alphanumeric string assigned to the file by file storage system 608 or a filename assigned to the file by the client device requesting storage thereof.

Much like databases 610 and 620, containers 630 and 640 may be replicated among respective server clusters. Namely, container 630 may be replicated among server clusters 632 and 634 and container 640 may be replicated among server clusters 642 and 644. Server clusters 632, 634, 642, and 644 may be geographically distributed to provide redundancy and reduced access times, much like server clusters 612, 614, 622, and 624.

Accordingly, remote storage system 602 may allow managed network 300 to offload storage structure allocation and management to remote computing system 600. Remote storage system 602 may additionally help reduce usage of storage and computational resources on managed network 300, as remote storage system 602 may reduce or eliminate the need for computing devices in managed network 300 to be used for storage and management of storage allocation.

Remote computing system 600 may further include computing resources 604, which may include a plurality of services, including services 650, 652, 654, and 656 (i.e., services 650-656). Services 650-656 may be used on-demand by various client devices associated with managed network 300, by other services provided by remote computing system 600, and/or by remote storage system 602. Services 650-656 may each take on various forms and provide functions, features, operations, and/or components for the benefit of managed network 300. Accordingly, services 650-656 may alternatively be referred to as software functions. Services 650-656 may include or may provide aspects of web-based applications, such as an e-mail service, a service for building web-based applications, and/or a service for testing web-based applications, among other possibilities. Services 650-656 may also include computing resources provided by computing devices that make up remote computing system 600.

Each service may be associated with respective code that defines at least part of the functions, features, operations, and/or components of the service. Namely, service 650 may be associated with code 660, service 652 may be associated with code 662, service 654 may be associated with code 664, and service 656 may be associated with code 666. In one example, one or more of code 660-666 may be uploaded to remote computing system 600 by way of a computing device associated with managed network 300 such that code 660-666 is remotely hosted and executable by computing resources 604 on behalf of managed network 300. Computing resources 604 may represent, for example, the AWS LAMBDA® platform provided by AMAZON WEB SERVICES®, while services 650-656 may be various AWS LAMBDA® functions.

Thus, services 650-656 may allow managed network 300 to offload management and resource allocation for execution of code 660-666 to remote computing system 600. Moreover, services 650-656 may help reduce usage of computational resources on managed network 300, as services 650-656 may eliminate the need to store and/or execute code 660-666 on computing devices in managed network 300.

Code 660-666 could take various forms. For example, code 660-666 may be or may otherwise include source code, which may be a collection of computer instructions written in one or more programming languages as plain text. In another example, code 660-666 may be or may otherwise include object code, which may be statements or instructions in a computer language as produced by a compiler. In yet another example, code 660-666 may be or may otherwise include one or more configuration files, which may be files that specify parameters and/or initial settings for a computer program. In yet another example, code 660-666 may be or may otherwise include one or more log files, which may be files that include records of events and/or communications that occur in association with certain software. In yet another example, code 660-666 may be or may otherwise include one or more environmental variables, which may be dynamically-named variables that are mapped to other program variable(s) and that affects execution of program(s) using code 660-666 in accordance with this mapping. Other examples are also possible.

Computing resources 604 may be assigned to execute services 650-656 on demand, which effectively allows managed network 300 to use computing resources of remote computing system 600 on an as-needed basis for executing remotely hosted code 660-666. Given that computing resources 604 are assigned on demand, remote computing system 600 might not have any specific computing devices dedicated to execution of services 650-656. Accordingly, code 660-666 may be considered to be a "serverless resource."

Services 650-656 may be executed in response to one or more trigger events, which may indicate the need or demand to allocate computing resources to one or more of services 650-656. An example trigger event may involve a client device transmitting, to service 650, a request for service 650 (or a software program of which service 650 is a subset) to execute and provide a corresponding response, so that the client device receives certain information and/or carries out operations as a result of execution of service 650. Thus, the trigger events may be initiated by entities outside of remote computing system 600, including, for example, a software application that is associated with managed network 300 or a software application that is associated with remote network management platform 320, among other possibilities.

Trigger events may also be initiated by entities inside of remote computing system 600. For example, trigger events may be initiated by a software application that is associated with remote computing system 600 or another one of the services hosted by computing resources 604, among other possibilities. For example, the trigger event may involve a modification of one or more of storage structures 610, 620, 630, or 640. Namely, service 650 may be invoked based on or in response to a modification of database 610, service 652 may be invoked based on or in response to a modification of database 620, service 654 may be invoked based on or in response to a modification of container 630, and service 656 may be invoked based on or in response to a modification of container 640, as indicated by the dashed lines extending therebetween.

In one implementation, remote storage system 602 may be configured to generate a log file of operations carried out on or by each of storage structures 610, 620, 630, and 640. In the context of AMAZON WEB SERVICES®, for example, the log file may be referred to as a stream (e.g., a DYNAMODB® stream). Services 650-656, respectively, may monitor these log files for one or more predetermined operations (e.g., operations that indicate modifications to the respective storage structures). Detection of the one or more predetermined operations in the log file may cause the corresponding service to execute one or more corresponding functions or operations. In one example, a modification to database 610 may cause service 650 to generate and transmit a notification of this modification to one or more other services or computing devices. In another example, an accumulation of a predetermined number of operations (e.g., 10,000) in the log file associated with container 630 may cause service 652 to store a copy of the file in persistent storage (e.g., in a container of file storage system 608).

Notably, each of services 650-656 may also be configured to access and modify the contents of storage structures 610, 620, 630, and 640. For example, when service 654 is an email service, service 654 may access database 620 to retrieve and provide emails stored in database 620. Thus, some operations associated with storage structures 610, 620, 630, and 640 may cause execution of services 650-656 and/or some of services 650-656 may access data stored in storage structures 610, 620, 630, and 640.

VII. EXAMPLE DISCOVERY AND MAPPING OF REMOTE COMPUTING SYSTEMS

Figure 7:
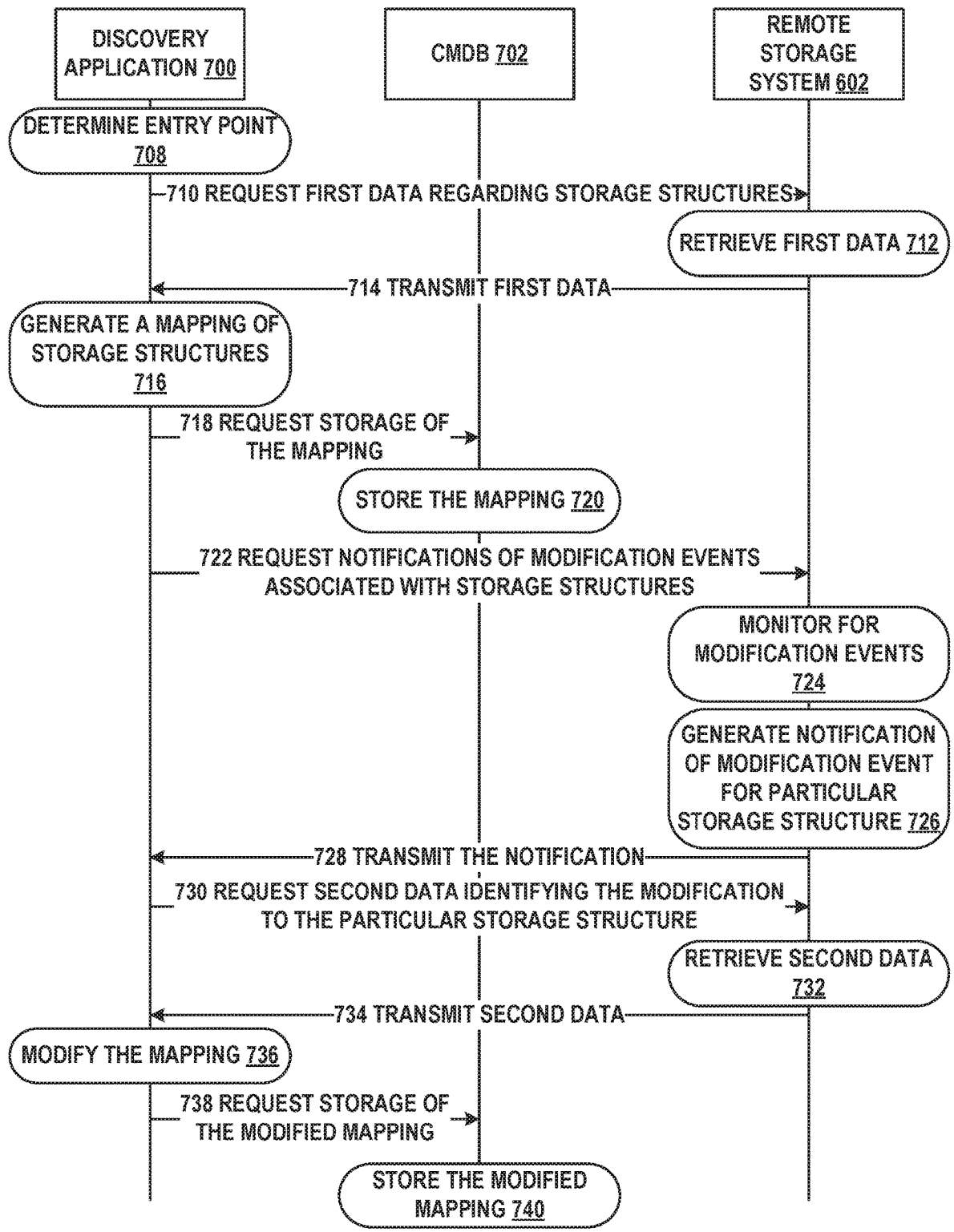
FIG. 7 is a message flow diagram, in accordance with example embodiments.

FIG. 7 illustrates example operations for discovery and service mapping of various aspects of remote computing system 600. Namely, these operations may be carried out to discover remote storage system 602, database system 606, file storage system 608, and/or storage structures 610, 620, 630, and 640. In some cases, these operations may additionally discover computing resources 604 and/or services 650-656. Further, these operations may determine a mapping that indicates the relationships between remote storage system 602, database system 606, file storage system 608, storage structures 610, 620, 630, and 640, computing resources 604, services 650-656, and/or any other aspects of remote computing system 600 discussed with respect to FIG. 6.

The discovery and service mapping operations may be carried out or facilitated by discovery application 700. Discovery application 700 may be provided by proxy servers 312 in managed network 300, computational instance 322 associated with managed network 300, or a combination thereof. That is, in some implementations, the operations of discovery application 700 may be distributed among managed network 300 and remote network management platform 320. Discovery application 700 may use CMDB 702 to store the discovered and mapped aspects of remote computing system 600 as one or more configuration items. CMDB 702 may be disposed within computational instance 322. Alternatively, CMDB 702 may be disposed within managed network 300 or distributed among managed network 300 and one or more computational instances of remote network management platform 320.

Discovery application 700 may be configured to initiate the discovery and mapping by determining an entry point for remote storage system 602, as indicated by block 708. The entry point may include, for example, a uniform resource locator (URL) used to access or otherwise associated with remote storage system 602, database system 606, file storage system 608, or one or more of storage structures 610, 620, 630, and/or 640. In the case of DYNAMODB®, the entry point for database system 606 may be https://dynamodb.<aws-region>.amazonaws.com, where <aws-region> indicates the geographic area in which database 610 or 620 are hosted. In the case of AMAZON SIMPLE STORAGE SERVICE®, the entry point for file storage system 608 may be https://<container-name>.s3.<aws-region>.amazonaws.com, where <aws-region> indicates the geographic area in which container 630 or 640 are hosted and <container-name> indicates one of containers 630 or 640. Other URL schemes are possible. In another example, the entry point may include an identifier of one or more host computing devices assigned to the respective storage structure sought to be discovered and a name assigned to the storage structure (e.g., an AMAZON WEB SERVICES® resource name).

The entry point may be determined by receiving, by way of a user interface associated with discovery application 700, input that identifies the entry point. In another example, the entry point may be determined by identifying an association between the entry point and one or more services or applications. For example, while performing discovery and/or mapping of computing resources 604 and/or services 650-656, discovery application 700 may identify a URL by way of which one or more of these resources or services accesses remote storage system 602. Discovery application 700 may subsequently use this URL to discover and map aspects of remote storage system 602.

Discovery application 700 may additionally be provided with or otherwise obtain access credentials for communicating with remote storage system 602. In one example, these credentials may take the form of an access token (e.g., a Java® Web Token (JWT)) provided to discovery application 700 by remote computing system 600 (e.g., an authorization server thereof).

Based on or in response to determining the entry point at block 708, discovery application 700 may be configured to transmit, to remote storage system 602, a request for first data regarding storage structures provided by remote storage system 602, as indicated by arrow 710. The first data may identify relationships among the storage structures provided by remote storage system 602.

For example, the request at arrow 710 may be directed to database system 606 and the first data may thus indicate databases 610 and 620 as the storage structures, how databases 610 and 620 are related (e.g., one table in database 610 references another table in database 620), the replication of databases 610 and 620 among server clusters 612, 614, 622, and 624, and the geographic distribution of server clusters 612, 614, 622, and 624, among other aspects. In some implementations, the first data may also indicate additional attributes of database system 606 and/or databases 610 and 620. For example, the first data may indicate a name of the provider of remote computing system 600 (e.g., AMAZON WEB SERVICES®), a name of database system 606 (e.g., DYNAMODB®), the names of databases 610 and 620, times at which databases 610 and/or 620 were created, whether automatic scaling (e.g., automatic allocation of additional computing resources to handle requested throughput) is enabled for reads and/or writes of databases 610 and/or 620, whether encryption is enabled (and the type thereof) for databases 610 and/or 620, sizes of databases 610 and/or 620 and/or tables or objects therein, and an amount of allotted throughput (e.g., reads and writes allotted per unit of time) consumed by traffic to databases 610 and/or 620, among other attributes. The first data may also indicate any other aspects shown in or described with respect to FIG. 6.

In another example, the request at arrow 710 may be directed to file storage system 608. The first data may thus indicate container 630 and 640 as the storage structures, the replication of container 630 and 640 among server clusters 632, 634, 642, and 644, and the geographic distribution of server clusters 632, 634, 642, and 644, among other aspects. In some implementations, the first data may also indicate additional attributes of file storage system 608 and/or containers 630 and 640. For example, the first data may indicate a name of the provider of remote computing system 600 (e.g., AMAZON WEB SERVICES®), a name of file storage system 608 (e.g., AMAZON SIMPLE STORAGE SERVICE®), the names of container 630 and 640, times at which containers 630 and 640 were created, names of owners of containers 630 and 640, whether automatic scaling (e.g., automatic allocation of additional computing resources to handle requested throughput) is enabled for reads and/or writes of containers 630 and/or 640, whether encryption is enabled (and the type thereof) for containers 630 and/or 640, sizes of containers 630 and/or 640 and/or the files stored therein, and an amount of allotted storage consumed by files stored in containers 630 and/or 640, among other attributes. Again, the first data may also indicate any other aspects shown in or described with respect to FIG. 6.

The first data may additionally identify relationships among the storage structures provided by remote storage system 602 and services 650-656. For example, the first data may indicate that service 650 accesses database 610 or that operations on (e.g., modifications to) database 610 invoke execution of service 650, as indicated by the corresponding arrow in FIG. 6. Similarly, the first data may also indicate that services 652, 654, and 656 access container 630, database 620, and container 640, respectively, or that operations on container 630, database 620, and container 640 invoke execution of services 652, 654, and 656, respectively, as indicated by the corresponding arrows in FIG. 6.

The request at arrow 710 may be transmitted to remote storage system 602 by way of the entry point identified at block 708. In one implementation, discovery application 700 may be configured to use a representational state transfer (REST) application programming interface (API) provided by remote storage system 602 to transmit the request at arrow 710. In another implementation, discovery application 700 may be configured to use a command line interface provided by remote storage management system 602 to transmit the request at arrow 710. Notably, the request for first data may include multiple different REST API calls or command line commands (not shown) that collectively cause remote storage system 602 to obtain and provide the first data to discovery application 700. That is, different REST API calls or command line commands may be configured to cause remote storage system 602 to generate different portions of the first data.

Accordingly, based on or in response to receiving the request at arrow 710, remote storage system 602 may be configured to generate and/or retrieve the first data, as indicated by block 712. Generating the first data may involve accessing one or more configuration files, log files, or other records that contain the first data or aspects thereof. For example, determining the replication of storage structure 610 among server clusters 612 and 614 may involve accessing configuration data associated with database 610 to retrieve an indication of this replication. In another example, determining a relationship between storage structures 610, 620, 630, and 640 and services 650-656 may involve parsing code 660-666 to identify the storage structures that a particular service accesses or operates on.

Based on or in response to generating and/or retrieving the first data at block 712, remote storage system 602 may be configured to transmit the first data to discovery application 700, as indicated by arrow 714. When multiple different commands are involved in obtaining the first data, the operations of arrow 710, block 712, and arrow 714 may be repeated multiple times until the complete set of first data is retrieved and transmitted to discovery application 700.

Based on or in response to reception of the first data at arrow 714, discovery application 700 may be configured to generate a mapping of the storage structures, as indicated by block 716. The mapping may indicate the storage structures, the attributes associated with each storage structure, and the relationships therebetween. For example, a visual representation of the mapping may be similar to what is shown in FIG. 6. Namely, the mapping may indicate each storage structure as a parent node and each replication thereof as a child node, with the parent node connected to each child node by an edge. For example, database 610 may be represented by a parent node and the replications thereof to server clusters 612 and 614 may be represented as child nodes. Each of these nodes may be associated with the respective attributes corresponding thereto (e.g., database name, database size, geographic location of each server cluster, etc.).

Based on or in response to generating the mapping at block 716, discovery application 700 may be configured to request storage of the mapping in CMDB 702, as indicated by arrow 718. Based on or in response to the request at arrow 718, CMDB 702 may be configured to store the mapping as one or more configuration items, as indicted by block 720. The stored mapping may be subsequently retrieved from CMDB 702 to allow for visualization of the various components of remote computing system 600 and the relationships therebetween. For example, the configuration items may be retrieved from CMDB 702, a visual representation of the mapping may be generated based thereon, and the mapping may be displayed by way of a user interface. The user interface may allow for interaction with the mapping to view various aspects thereof. For example, selection of one of a node represented in the mapping may provide a detailed representation of the attributes associated with this node.

Discovery application 700 may additionally be configured to generate and transmit, to remote storage system 602, a request for notifications of modification events associated with the storage structures identified by the first data, as indicated by arrow 722. This request may identify a URL associated with discovery application 700 to which the notifications generated by remote storage system 602 are to be addressed. Additionally, in some implementations, the request at arrow 722 may identify specific storage structures that remote storage system 602 is to monitor for modification events. In some implementations, the operations of arrow 722 may be carried out based on or in response to storing the mapping at block 720. For example, discovery application may configure remote storage system 602 to monitor for and provide notifications of modification events associated with the storage structures identified by the first data and/or reflected in the mapping.

In other implementations, the operations of arrow 722 may be carried out based on or in response to a selection (e.g., made by a user) of a subset of the storage structures identified by the first data. Additionally or alternatively, the request for notifications may be provided to remote storage system 602 manually by way of a user interface provided thereby. Discovery application 700 may nevertheless facilitate this operation by identifying the storage structures for which notifications are to be provided and identifying the URLs that remote storage system 602 is to transmit the notifications to, among other operations.

Remote storage system 602 may be configured to execute a plurality of operations on the storage structures provided thereby as part of maintaining, modifying, and/or otherwise managing these storage structures. A subset of these operations may result in the storage structures being modified, and may thus be referred to as modification events. A modification even may include deletion of a storage structure, generation (i.e., creation) of a new storage structure, addition of data to a particular storage structure, deletion of data from the particular storage structure, update of data stored in the particular storage structure, and/or association of a storage structure with a service (e.g., service 650) provided by computing resources 604, among other possibilities.

By requesting notification of modification events, discovery application 700 may avoid periodically polling, re-discovering, and/or re-mapping aspects of remote storage system 602. Notably, when the storage structures are not modified since the most recent execution of discovery and mapping operations, such periodic polling, re-discovering, and/or re-mapping, might not identify any changes in the storage structures but may nevertheless utilize computing resources. Thus, in order to conserve computing resources, discovery application 700 may instead configure remote storage system 602 to monitor the storage structures thereof for modification events. Discovery application 700 may execute the re-discovering and/or re-mapping operations when the storage structures are modified and may focus these operations on the modified storage structures while omitting storage structures that have not been modified.

Accordingly, based on or in response to reception of the request at arrow 722, remote storage system 602 may be configured to monitor the storage structures for modification events, as indicated by block 724. For example, a service provided by computing resources 604 may be configured to monitor the log file associated with each storage structure designated at arrow 722 for indications of modification events. When a modification event is detected for a particular storage structure, this or another service may be configured to generate a notification of this modification event, as indicated by block 726. In other implementations, storage system 602 may provide another mechanism for generating the notification. For example, remote storage system 602 may be configured to generate the notification each time a modification is made to a respective storage structure without using a log file. That is, for example, database system 606 or file storage system 608 may be configured to generate the notification as part of executing the modification operation.

Based on or in response to generating the notification at block 726, remote storage system 602 may be configured to transmit, to discovery application 700, the notification, as indicated by arrow 728. In the case of AMAZON WEB SERVICES®, the notification may be transmitted by way of the AMAZON SIMPLE NOTIFICATION SERVICE®. Alternatively, an AWS LAMBDA® function may be configured to transmit the notification. The notification may include an identifier of the particular storage structure that has been modified, among other information concerning the modification event.

Thus, based on or in response to reception of the notification at arrow 728, discovery application 700 may be configured to transmit, to remote storage system 602, a request for second data identifying the modification made to the particular storage structure, as indicated by arrow 730. Notably, discovery application 700 might not request data associated with storage structures for which a notification of a modification even has not been received (e.g., storage structures that have not been modified since they were last mapped).

Based on or in response to reception of the request at arrow 730, remote storage system 602 may be configured to retrieve the second data, as indicate by block 732. The retrieval of the second data at block 732 may be similar to the retrieval of the first data at block 712. Notably, however, the retrieval of the second data may be directed at storage structures that have been modified since the mapping was last updated, rather than focusing on all storage structures provided by remote storage system 602. For example, when database 620 is modified, but database 610, container 630, and container 640 remain unmodified, the second data may indicate the relationships and attributes of database 620, but might not include commensurate information regarding database 610, container 630, and container 640.

Additionally, in some implementations, the second data might reflect only attributes and relationships that have been changed by the modification event, rather than including both changed and unchanged attributes and relationships for the particular storage structure. For example, when container 630 is associated with a new service, but remains otherwise unchanged, the second data might indicate this new relationship between container 630 and the new service, but might not indicate other unmodified attributes of container 630 or the unmodified relationships between container 630 and other storage structures or services. The second data may thus indicate aspects of the particular storage structure that have changed since the last iteration of the mapping operations, without also indicating unchanged aspects, thereby conserving computational resources and network bandwidth.

Based on or in response to retrieving the second data at block 732, remote storage system 602 may be configured to transmit the second data to discovery application 700, as indicated by arrow 734. Based on or in response to receiving the second data, discovery application 700 may be configured to modify the mapping generated at block 716, as indicated by block 736. Namely, the mapping may be modified to reflect any changes in the attributes or relationships of the particular storage structure associated with the modification event of which discovery application was notified at arrow 728. Notably, in order to modify this mapping, the mapping may first be retrieved from CMDB 702 (not shown).

In one example, new data may be stored in the particular storage structure. Accordingly, the mapping may be modified to reflect this new data by, for example, indicating that the size of the storage structure has increased or that the number of entries or objects therein has increased. In another example, a particular storage structure may be replicated to an additional server cluster. Accordingly, the mapping may be modified by generating a new child node for this additional server cluster and connecting the new child node to the parent node of the particular storage structure. Additionally, the attributes of the new child node may be assigned the attributes indicated by the second data (e.g., an indication of the geographic region in which this server cluster resides). Other modifications and commensurate changes to the mapping are possible.

Based on or in response to modifying the mapping at block 736, discovery application 700 may be configured to request storage of the modified mapping, as indicated by arrow 738. Based on or in response to reception of the request at arrow 738, CMDB 702 may be configured to store the modified mapping by updating the one or more configuration items, as indicated by block 740. Updating the one or more configuration items may involve modifying the configuration items, adding new configuration items, and/or deleting existing configuration items.

The operations of block 724 through block 740 may be repeated as additional modification events take place on remote storage system 602. Accordingly, the mapping of the storage structures may be kept up-to-date by modifying the mapping each time a storage structure is actually modified. Notably, the mapping may be kept up-to-date without discovery application 700 polling remote storage system 602 to determine whether any storage structures have actually been modified, thereby reducing the amount of computational resources dedicated to maintaining an accurate mapping of the storage structures provided by remote storage system 602.

In some implementations, the operations of block 724 through block 740 may be repeated periodically rather than being carried out in response to each new notification of a modification event. For example, when the frequency of modification events and/or corresponding notifications is above a particular threshold, discovery application 700 may batch the operations of block 724 through block 740 to reduce usage of computing resources and network bandwidth. That is, as discovery application 700 receives notifications of modification events, discovery application 700 may keep a queue of the storage structures that have been modified. Discovery application 700 may then periodically re-discover and/or re-map the storage structures that are in the queue and clear the queue following successful re-mapping.

VIII. EXAMPLE OPERATIONS

Figure 8:
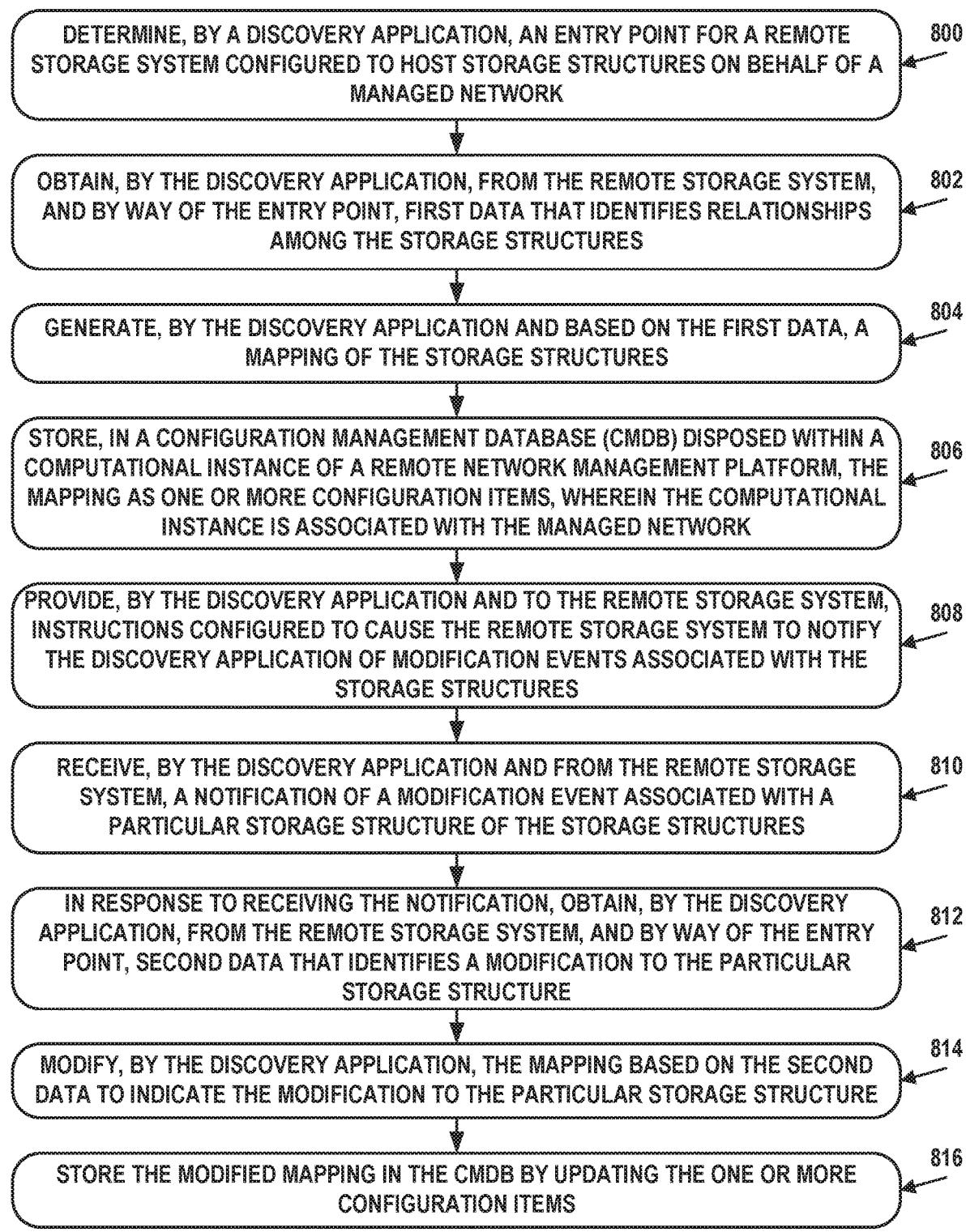
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve determining, by a discovery application, an entry point for a remote storage system configured to host storage structures on behalf of a managed network.

Block 802 may involve obtaining, by the discovery application, from the remote storage system, and by way of the entry point, first data that identifies relationships among the storage structures.

Block 804 may involve generating, by the discovery application and based on the first data, a mapping of the storage structures.

Block 806 may involve storing, in a CMDB disposed within a computational instance of a remote network management platform, the mapping as one or more configuration items. The computational instance may be associated with the managed network.

Block 808 may involve providing, by the discovery application and to the remote storage system, instructions configured to cause the remote storage system to notify the discovery application of modification events associated with the storage structures.

Block 810 may involve receiving, by the discovery application and from the remote storage system, a notification of a modification event associated with a particular storage structure of the storage structures.

Block 812 may involve, in response to receiving the notification, obtaining, by the discovery application, from the remote storage system, and by way of the entry point, second data that identifies a modification to the particular storage structure.

Block 814 may involve modifying, by the discovery application, the mapping based on the second data to indicate the modification to the particular storage structure.

Block 816 may involve storing the modified mapping in the CMDB by updating the one or more configuration items.

In some embodiments, each respective storage structure of the storage structures may be replicated among two or more geographically-distributed server clusters. The first data may indicate, for each respective storage structure, the two or more geographically-distributed server clusters. Generating the mapping may involve generating, for each respective storage structure, (i) a parent node representing the respective storage structure and (ii) two or more child nodes representing the replication of the respective storage structure among the two or more geographically-distributed server clusters. The parent node may be connected to each of the two or more child nodes by respective edges.

In some embodiments, the first data may further identify relationships between (i) the storage structures and (ii) software functions executable using computing resources provided by the remote storage system in response to one or more trigger events associated with the storage structures.

In some embodiments, the computing resources may be assigned to execute the software functions based on demand for execution thereof.

In some embodiments, the one or more trigger events may include the modification events.

In some embodiments, generating the instructions configured to cause the remote storage system to notify the discovery application of modification events associated with the storage structures may involve generating a URL that addresses the discovery application. The remote storage system may be configured to provide notifications of the modification events to the URL.

In some embodiments, the remote storage system may be configured to generate operational records that identify operations carried out on the storage structures. The modification events may include a subset of the operations that performs at least one of (i) changing data stored by the storage structures, (ii) generating a new storage structure, (iii) deleting one of the storage structures, or (iv) associating one or more of the storage structures with a software function executable using computing resources provided by the remote storage system in response to one or more trigger events associated with the one or more of the storage structures.

In some embodiments, the entry point for the remote storage system may include an identifier of one or more host computing devices associated with the storage structures and a resource name assigned to the storage structures.

In some embodiments, the remote storage system may include a database system. The storage structures may include one or more of (i) database tables organized by rows, (ii) database tables organized by columns, (iii) key-value pairs, (iv) documents, or (v) graph structures comprising nodes connected by edges. For example, the database system may be DYNAMODB® provided by AMAZON WEB SERVICES®.

In some embodiments, the remote storage system may include a file storage system. The storage structures may include containers configured to store therein data as one or more objects, wherein each object is addressable by a key value associated therewith. For example, the file storage system may be AMAZON SIMPLE STORAGE SERVICE®

In some embodiments, the first data may further identify, for each respective storage structure of the storage structures, a plurality of attributes associated with the respective storage structure. The second data may further identify a change in one or more attributes of the plurality of attributes of the particular storage structure. The mapping may be modified based on the second data to indicate the change in the one or more attributes of the particular storage structure.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a configuration management database (CMDB) disposed within a computational instance of a remote network management platform, wherein the computational instance is associated with a managed network, and wherein a remote storage system is configured to host storage structures on behalf of the managed network; and
   a discovery application configured to perform operations comprising:
      determining an entry point for the remote storage system;
      obtaining, from the remote storage system and by way of the entry point, first data that identifies relationships among the storage structures;
      generating, based on the first data, a mapping of the storage structures;
      storing, in the CMDB, the mapping as one or more configuration items;
      providing, to the remote storage system, instructions configured to cause the remote storage system to notify the discovery application of modification events associated with the storage structures;
      receiving, from the remote storage system, a notification of a modification event associated with a particular storage structure of the storage structures;
      in response to receiving the notification, obtaining, from the remote storage system and by way of the entry point, second data that identifies a modification to the particular storage structure;
      modifying the mapping based on the second data to indicate the modification to the particular storage structure; and
      storing the modified mapping in the CMDB by updating the one or more configuration items.

2. The computing system of claim 1, wherein each respective storage structure of the storage structures is replicated among two or more geographically-distributed server clusters, wherein the first data indicates, for each respective storage structure, the two or more geographically-distributed server clusters, and wherein generating the mapping comprises:

generating, for each respective storage structure, (i) a parent node representing the respective storage structure and (ii) two or more child nodes representing the replication of the respective storage structure among the two or more geographically-distributed server clusters, wherein the parent node is connected to each of the two or more child nodes by respective edges.

3. The computing system of claim 1, wherein the first data further identifies relationships between (i) the storage structures and (ii) software functions executable using computing resources provided by the remote storage system in response to one or more trigger events associated with the storage structures.

4. The computing system of claim 3, wherein the computing resources are assigned to execute the software functions based on demand for execution thereof.

5. The computing system of claim 3, wherein the one or more trigger events comprise the modification events.

6. The computing system of claim 1, wherein the operations further comprise:

generating the instructions configured to cause the remote storage system to notify the discovery application of modification events associated with the storage structures by generating a uniform resource locator (URL) that addresses the discovery application, wherein the remote storage system is configured to provide notifications of the modification events to the URL.

7. The computing system of claim 1, wherein the remote storage system is configured to generate operational records that identify operations carried out on the storage structures, and wherein the modification events comprise a subset of the operations that performs at least one of (i) changing data stored by the storage structures, (ii) generating a new storage structure, (iii) deleting one of the storage structures, or (iv) associating one or more of the storage structures with a software function executable using computing resources provided by the remote storage system in response to one or more trigger events associated with the one or more of the storage structures.

8. The computing system of claim 1, wherein the entry point for the remote storage system comprises an identifier of one or more host computing devices associated with the storage structures and a resource name assigned to the storage structures.

9. The computing system of claim 1, wherein the remote storage system comprises a database system, and wherein the storage structures comprise one or more of (i) database tables organized by rows, (ii) database tables organized by columns, (iii) key-value pairs, (iv) documents, or (v) graph structures comprising nodes connected by edges.

10. The computing system of claim 1, wherein the remote storage system comprises a file storage system, and wherein the storage structures comprise containers configured to store therein data as one or more objects, wherein each object is addressable by a key value associated therewith.

11. The computing system of claim 1, wherein the first data further identifies, for each respective storage structure of the storage structures, a plurality of attributes associated with the respective storage structure, wherein the second data further identifies a change in one or more attributes of the plurality of attributes of the particular storage structure, and wherein the mapping is modified based on the second data to indicate the change in the one or more attributes of the particular storage structure.

12. A method comprising:

determining, by a discovery application, an entry point for a remote storage system configured to host storage structures on behalf of a managed network;

obtaining, by the discovery application, from the remote storage system, and by way of the entry point, first data that identifies relationships among the storage structures;

generating, by the discovery application and based on the first data, a mapping of the storage structures;

storing, in a configuration management database (CMDB) disposed within a computational instance of a remote network management platform, the mapping as one or more configuration items, wherein the computational instance is associated with the managed network;

providing, by the discovery application and to the remote storage system, instructions configured to cause the remote storage system to notify the discovery application of modification events associated with the storage structures;

receiving, by the discovery application and from the remote storage system, a notification of a modification event associated with a particular storage structure of the storage structures;

in response to receiving the notification, obtaining, by the discovery application, from the remote storage system, and by way of the entry point, second data that identifies a modification to the particular storage structure;

modifying, by the discovery application, the mapping based on the second data to indicate the modification to the particular storage structure; and storing the modified mapping in the CMDB by updating the one or more configuration items.

13. The method of claim 12, wherein each respective storage structure of the storage structures is replicated among two or more geographically-distributed server clusters, wherein the first data indicates, for each respective storage structure, the two or more geographically-distributed server clusters, and wherein generating the mapping comprises:

generating, for each respective storage structure, (i) a parent node representing the respective storage structure and (ii) two or more child nodes representing the replication of the respective storage structure among the two or more geographically-distributed server clusters, wherein the parent node is connected to each of the two or more child nodes by respective edges.

14. The method of claim 12, wherein the first data further identifies relationships between (i) the storage structures and (ii) software functions executable using computing resources provided by the remote storage system in response to one or more trigger events associated with the storage structures.

15. The method of claim 14, wherein the computing resources are assigned to execute the software functions based on demand for execution thereof.

16. The method of claim 14, wherein the one or more trigger events comprise the modification events.

17. An article of manufacture including a non-transitory computer-readable medium, having stored thereon program instructions that, upon execution by a computing system, cause the computing system to perform operations comprising:

determining an entry point for a remote storage system configured to host storage structures on behalf of a managed network;

obtaining, from the remote storage system and by way of the entry point, first data that identifies relationships among the storage structures;

generating, based on the first data, a mapping of the storage structures;

storing, in a configuration management database (CMDB) disposed within a computational instance of a remote network management platform, the mapping as one or more configuration items, wherein the computational instance is associated with the managed network;

providing, to the remote storage system, instructions configured to cause the remote storage system to notify the computing system of modification events associated with the storage structures;

receiving, from the remote storage system, a notification of a modification event associated with a particular storage structure of the storage structures;

in response to receiving the notification, obtaining, from the remote storage system and by way of the entry point, second data that identifies a modification to the particular storage structure;

modifying the mapping based on the second data to indicate the modification to the particular storage structure; and storing the modified mapping in the CMDB by updating the one or more configuration items.

18. The article of manufacture of claim 17, wherein each respective storage structure of the storage structures is replicated among two or more geographically-distributed server clusters, wherein the first data indicates, for each respective storage structure, the two or more geographically-distributed server clusters, and wherein generating the mapping comprises:

generating, for each respective storage structure, (i) a parent node representing the respective storage structure and (ii) two or more child nodes representing the replication of the respective storage structure among the two or more geographically-distributed server clusters, wherein the parent node is connected to each of the two or more child nodes by respective edges.

19. The article of manufacture of claim 17, wherein the first data further identifies relationships between (i) the storage structures and (ii) software functions executable using computing resources provided by the remote storage system in response to one or more trigger events associated with the storage structures.

20. The article of manufacture of claim 19, wherein the one or more trigger events comprise the modification events.

* * * * *